Patented May 7, 1929.

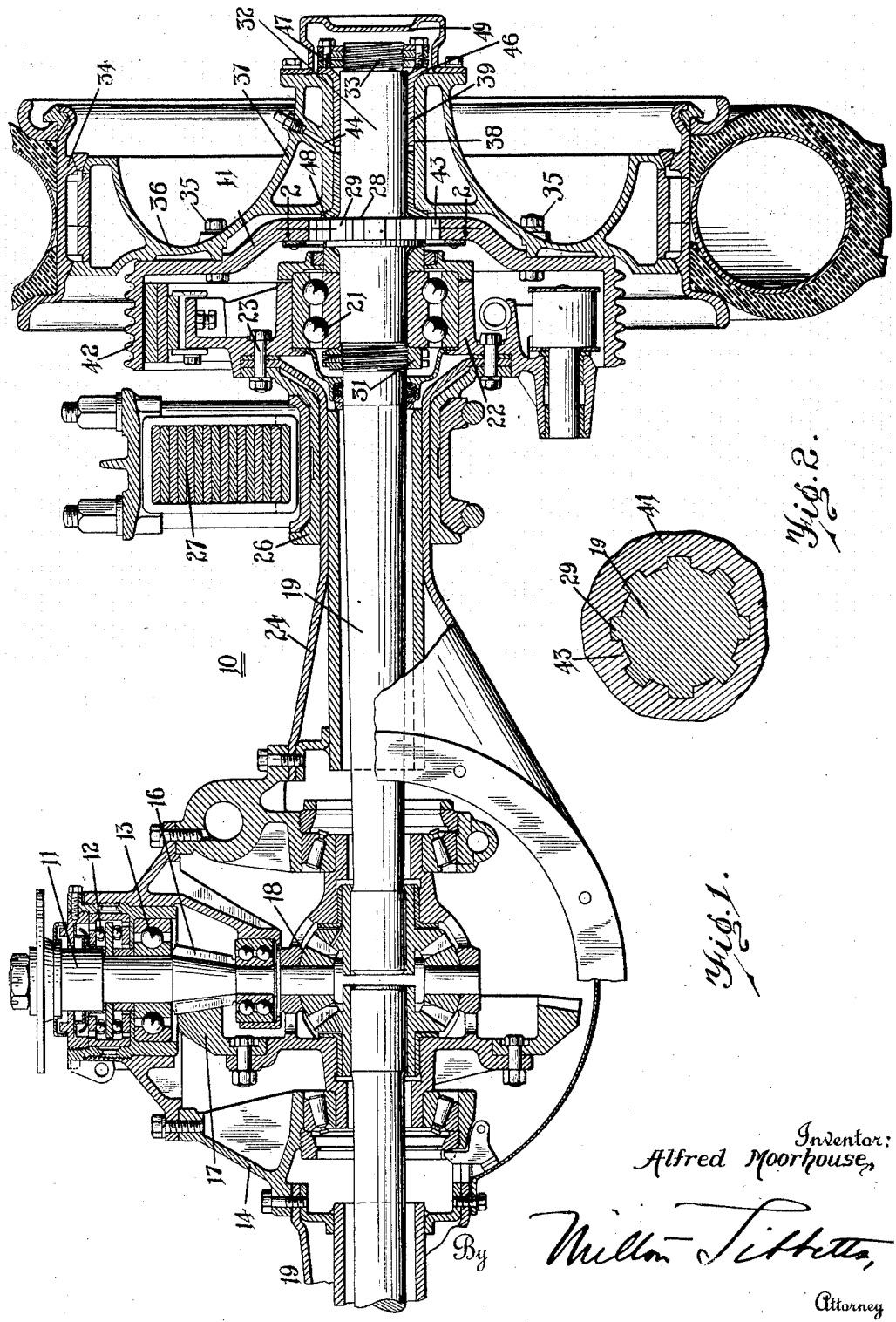

1,712,457

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 23, 1923. Serial No. 627,197.

This invention relates to motor vehicles, particularly to the rear axle construction thereof, and it has for an object to provide apparatus of the character designated in which the vehicle driving wheel shall be rigidly secured to the driving axle in such a manner that it may be readily removed therefrom with ordinary tools.

Another object of the invention is to provide a rear axle for motor vehicles in which slight relative motion between the driving axle and the wheel hub shall not cause undue wear in either of the cooperating parts.

Other objects and structural features of the invention will be apparent from the subjoined description, in connection with the accompanying drawing, in which:

Fig. 1 is a longitudinal section through a portion of the rear axle and driving wheel of a motor vehicle equipped with an embodiment of this invention, and Fig. 2 is a section on the line 2—2 of Fig. 1.

In the construction of motor vehicles it has heretofore been the usual practice to secure the driving axle to its wheel by providing a taper at the end of the axle, adapted to fit a tapered bore in the wheel hub. The parts are secured against relative rotation by a tapered key, fitting in cooperating keyways in the hub and the axle. The wheel hub is held axially on the tapered axle by a nut, threaded on the end of the axle and bearing against the wheel hub and the large end of the key. In large and heavy vehicles, and especially in trucks, if the taper and key construction is driven home tightly enough to insure rigidity of the connection, it becomes very difficult to remove the wheel with any ordinary tools, especially if the parts become slightly rusted together, as is well known. If not driven tightly home, the slight relative movement caused by the frequent reversal of torque between the wheel hub and axle, loosens the key, with damage to the keyways and ultimately to the axle.

By this invention is provide a connection which permits the heaviest truck wheels to be readily removed from their axles, and in which no damage or wear to any of the parts is occasioned by small relative movement between the axle and the wheel hub.

At 10 is shown one-half of a motor vehicle rear axle. The vehicle driving shaft 11 is journaled in bearings 12 and 13 in the housing 14 and is provided with a driving pinion 16, meshing with a ring gear 17, which drives the differential gearing 18 in the well known manner. The differential gearing 18 is operatively connected to a pair of aligned driving axles 19, only one of which is completely shown, the other being in all respects similar thereto.

The driving axle 19 is journaled, near its outer end, in a bearing 21, carried by a stationary member 22, which is bolted as at 23, to the flared end of a tube 24 enclosing the driving axle and secured at its inner end to the housing 14. The tube 24 also carries a spring saddle 26, on which the vehicle spring 27 is mounted, in a manner well understood in the art. The axle 19 is formed, intermediate the bearing 21 and its outer end, with a flange 28, the outer edge of which is provided with teeth or splines 29. The inner race of the bearing 21 is clamped against axial movement between the flange 28 and a clamping ring 31, secured to the shaft in any suitable way. The outer end of the driving axle is formed into a cylindrical journal portion 32, and is provided at the extreme end with a reduced or threaded portion 33.

The vehicle wheel, which comprises the usual rim 34, web or spoke portion 36 and hub 37, is journaled on the end portion of the axle so that relative rotary movement may take place between these members. To this end the hub 37 has a cylindrical bore 38, in which is fitted a two part bushing 39, which forms a bearing on the journal portion 32 of the driving axle 19. Removably secured to the web portion 36, as by the bolts 35, is an annular disk member 41, formed at its periphery with a brake drum 42. The inner edge of the annular disk 41 is provided with teeth or splines 43, adapted to cooperate with the teeth 29 on the driving axle flange 28. Since the disk 41 is secured to the web 36, it will be seen that this arrangement provides a driving connection between the driving axle and the vehicle wheel. The hub 38 is also provides with a passage 44, communicating with the journal 32, by which suitable lubricant can be injected to the surface thereof.

The outer end of the outer part of the bushing 39 is flared outwardly over the end of the hub 37, as shown at 46, and is engaged by a suitable nut 47 on the threaded portion 33 of the driving axle, so as to prevent outward axial movement of the wheel with respect thereto. The inner end of the inner part of the bushing 39 is flared outwardly and extends between the hub 37 and the flange 28 of the driving axle, as illustrated at 48. A suitable hub cap 49 may be provided to cover the nut 47 and is secured to the hub 37 in any convenient manner.

The operation of the invention will be evident from the foregoing description. The wheel hub 37 is driven from the driving axle 19 through the cooperating teeth 29 and 43, so that relative motion between the journal 32 and hub 37 will occur only to the extent of the play or backlash between these sets of teeth. Such play is very slight and as it is not interfered with by the journal mounting of the wheel, it does not increase the wear on the driving axle. Wear between the parts is further decreased by suitable lubrication through the passage 44. The wheel can be readily pulled off of the axle by removing the hub cap 49 and the retaining nut 47, the teeth 43 sliding axially out of engagement with the teeth 29.

It is apparent that this invention provides a simple, strong and accessible wheel mounting which may be readily disassembled.

It will be understood that various forms of the invention other than those described above may be used without departing from the spirit or scope of the invention.

What is claimed is:

1. In a motor vehicle, in combination, a driving axle, a flange on the axle near the end thereof, a wheel journaled on the axle between the end thereof and the flange, and means directly connecting the flange and the wheel for rotation together in driving relation.

2. In a motor vehicle, in combination, a driving axle, a toothed flange on the axle near the end thereof, a wheel journaled on the end portion of the axle adjacent the flange, means on the axle securing the wheel against axial movement thereon, and toothed means on the wheel meshing with and driven by said flange.

3. In an axle, in combination, an axle shaft having a journal portion, a wheel journaled on the journal portion of said axle shaft, means to retain said wheel against axial movement, and inter-locking driving means directly connecting the axle shaft and wheel for rotation together.

4. In a motor vehicle, the combination with an axle housing, of an axle having a cylindrical outer end portion and an integral flange adjacent the inner end of said outer portion, a wheel secured against axial movement and journaled on the cylindrical portion of the axle, and means on said wheel cooperating with the flange in driving relation.

5. In a motor vehicle, the combination of a driving axle having a bearing at its end, a wheel journaled on said bearing and adapted for easy removal therefrom, and interlocking connecting means to drive the wheel directly from said axle.

6. In a motor vehicle, the combination with a driving axle having a bearing at its end and a flange adjacent the bearing, said flange having teeth, and a two-part sleeve on said bearing, said sleeve having a flange at its inner end resting against said axle flange and having a flange at its outer end, of a wheel arranged on said sleeve between said flanges, said wheel having teeth in engagement with the teeth of said axle, and a nut threaded to the end of said axle and pressing against the outer flange of said sleeve to retain the wheel in place on the axle.

7. In an axle, in combination, an axle shaft having a journal portion, a wheel journaled on said portion of the shaft and axially removable therefrom, a toothed flange on said shaft adjacent the journal portion, and a toothed member on the wheel adapted to engage said toothed flange to drive the wheel, said flange and member being axially disengageable as the wheel is removed from the journal portion of the shaft.

In testimony whereof I affix my signature.

ALFRED MOORHOUSE.